United States Patent [19]
Brown

[11] 3,871,451
[45] Mar. 18, 1975

[54] PRODUCTION OF CRUDE OIL FACILITATED BY INJECTION OF CARBON DIOXIDE

[75] Inventor: Larry P. Brown, Tulsa, Okla.

[73] Assignee: Cities Service Oil Company, Tulsa, Okla.

[22] Filed: May 3, 1974

[21] Appl. No.: 466,668

[52] U.S. Cl. ............................ 166/267, 166/305 R
[51] Int. Cl. ........................................... E21b 43/00
[58] Field of Search ........................... 166/265–267, 166/263, 305 R; 55/68; 423/212, 220

[56] References Cited
UNITED STATES PATENTS

| | | | |
|---|---|---|---|
| 1,249,232 | 12/1917 | Squires | 166/266 |
| 2,039,330 | 5/1936 | McKee | 166/267 UX |
| 2,729,291 | 1/1956 | Haverfield | 166/266 |
| 3,193,006 | 7/1965 | Lewis | 166/266 |
| 3,228,467 | 1/1966 | Schlinger et al. | 166/266 |
| 3,442,332 | 5/1969 | Keith | 166/267 X |

*Primary Examiner*—Stephen J. Novosad
*Attorney, Agent, or Firm*—Elton F. Gunn

[57] ABSTRACT

Carbon dioxide is introduced into a hydrocarbon bearing formation and dissolved in crude oil contained therein, thus reducing the viscosity of the oil and improving its recoverability. An absorbent for carbon dioxide is injected into a tubing string of a well which extends into the hydrocarbon bearing formation. This absorbent can be either normally gaseous or liquid but in any case is in the form of a liquid when injected into the tubing string, e.g., paraffinic hydrocarbons having three or more carbon atoms. A flue gas which contains carbon dioxide and nitrogen is also introduced into the tubing string, at a depth where the carbon dioxide therein will dissolve in the absorbent while undesirable fractions of the flue gas, such as the nitrogen, go unabsorbed. Subsequently, the pressure on the carbon dioxide absorbent is reduced, thus releasing vaporized carbon dioxide which is then separated and injected into a hydrocarbon bearing formation where it becomes dissolved in the crude oil. The degassed absorbent is then reinjected into the well for absorption of more carbon dioxide.

15 Claims, 1 Drawing Figure

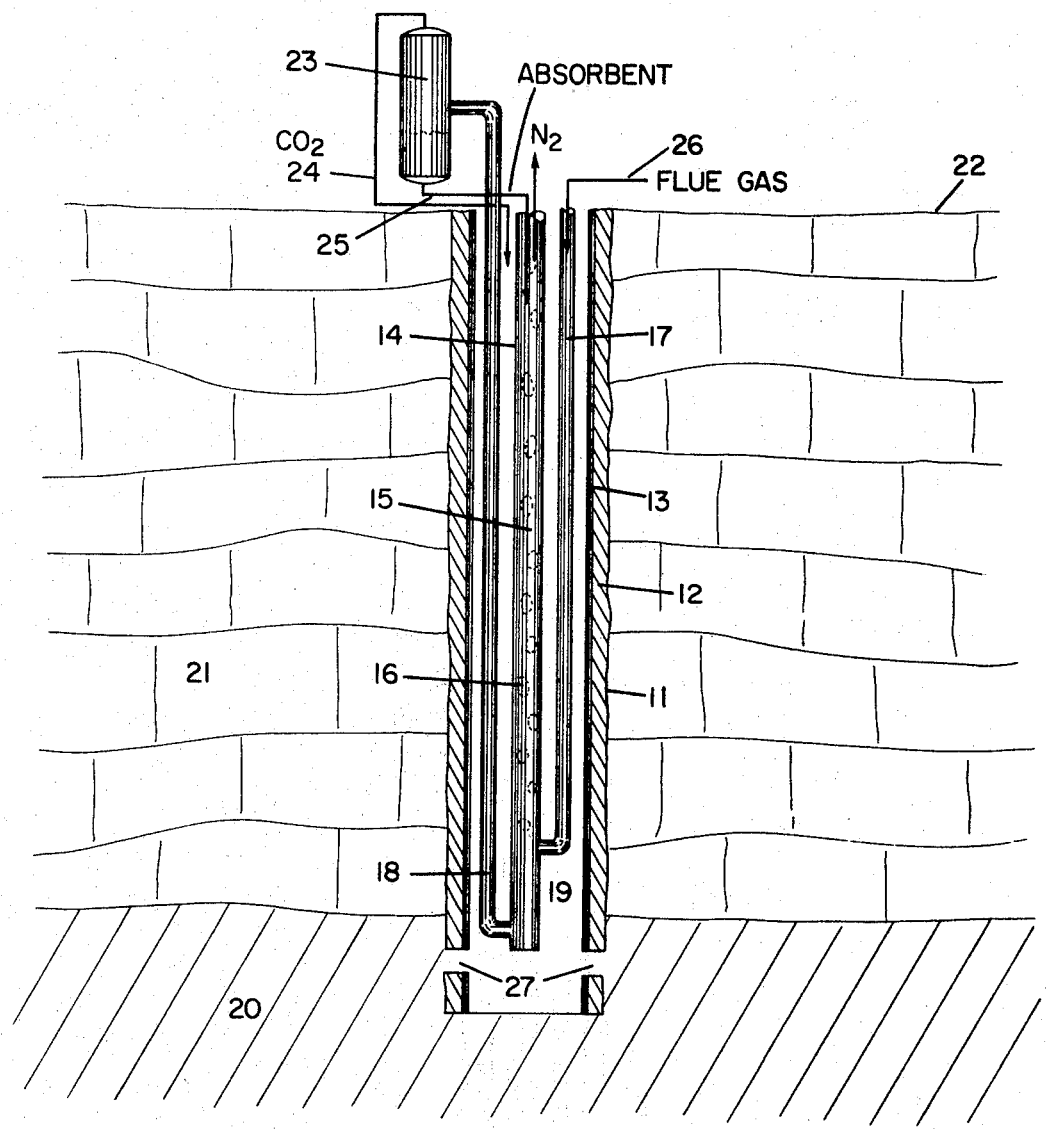

PRODUCTION OF CRUDE OIL FACILITATED BY INJECTION OF CARBON DIOXIDE

BACKGROUND OF THE INVENTION

The present invention relates to a process for producing crude oil from a hydrocarbon bearing formation. More particularly, the present invention is an improvement in the process of recovering a crude oil, e.g., a heavy oil, by injecting carbon dioxide into a hydrocarbon formation whereby the recoverability of the oil is enhanced through a reduction of viscosity by dissolving of the carbon dioxide in the oil.

Recent activity in the utilization of secondary and tertiary oil recovery techniques utilizing a miscible gas drive has brought on the desirability of injecting carbon dioxide into producing formations. A proposed method of using carbon dioxide in such fashion is taught by Keith, U.S. Pat. No. 3,442,332, whereby substantially pure gaseous carbon dioxide is injected into underground formations containing crude oil. Accordingly, carbon dioxide can first be produced along with hydrogen by means of partial oxidation and steam reformation. Large plants located above ground level are needed for separation of the carbon dioxide from the hydrogen, plus utilization of the hydrogen in an ammonia manufacturing process or an H-Oil process. The methods of Keith are thus bound to use of carbon dioxide extracted from the air or else from flue gas streams which contain large amounts of hydrogen.

Such processes are expensive and elaborate to the extent that the placement and use thereof in or near an oil field for production of carbon dioxide for miscible gas drives is generally impractical. What is needed is a relatively simple and inexpensive method for the production and purification of carbon dioxide in desirable quantities at the site of a producing oil well.

It is therefore an object of the present invention to provide an improved method of making and supplying relatively pure carbon dioxide to a hydrocarbon bearing formation in order to improve recovery of oil from the formation.

It is a further object of the present invention to utilize carbon dioxide, produced by the burning of carbonaceous fuels, for improving the recovery of crude oil from a hydrocarbon bearing formation.

It is still another object of the present invention to improve recovery of a crude oil from a hydrocarbon bearing formation by providing a simple and economic method of supplying carbon dioxide to a well at the site where the oil is being produced.

With these and other objects in mind, the present invention may be more fully understood through reference to the following drawing and description.

SUMMARY OF THE INVENTION

The present invention is an improvement in the process of recovering crude oil from a hydrocarbon bearing formation, with carbon dioxide being introduced into the formation and dissolved in the crude oil in order to lower its viscosity and thus enhance its recoverability.

An absorbent for carbon dioxide is injected into a tubing string of a well which extends into the formation wherein the crude oil resides. The absorbent can be an organic compound which is normally gaseous or liquid, but which at the pressure involved is in any case liquid in form when injected into the tubing string.

A flue gas which contains carbon dioxide and nitrogen is introduced into the tubing string of the well which contains the absorbent, with introduction of the flue gas being at such depth that substantially all of the carbon dioxide dissolves in the absorbent while the nitrogen passes through it and is separated and removed from the presence of the carbon dioxide.

Following this selective absorption of the carbon dioxide, the pressure on the absorbent is reduced, and there is thus vaporization of the carbon dioxide which causes it to leave the absorbent. Carbon dioxide which thus separates from the absorbent is then injected into the hydrocarbon bearing formation for dissolving in the crude oil.

In accordance with the present invention, the carbon dioxide which is mixed with a crude oil in a producing formation can be manufactured by burning a carbonaceous fuel such as methane or fuel oil with air, and can be separated from nitrogen of the flue gas by means of selective absorption of the carbon dioxide at high pressures which exist downhole in either an injection well of a secondary recovery process or a production-injection well in a "huff and puff" process.

BRIEF DESCRIPTION OF THE DRAWING

The drawing is a somewhat schematic process diagram which represents one embodiment of the present invention.

DETAILED DESCRIPTION OF THE INVENTION

In the present invention, carbonaceous fuels such as gaseous or liquid hydrocarbons are burned to produce flue gases consisting primarily of carbon dioxide and nitrogen. Wellhead natural gas, for instance, can be burned with air to produce a mixture of these gases. The inherent problems of separating the carbon dioxide from the nitrogen in such a mixture is solved in the present invention by injecting the flue gases into a well wherein the gases are mixed with a liquid absorbent at a depth at which the pressure within the wellbore is such that substantially all of the carbon dioxide becomes dissolved in the liquid absorbent while practically all of the nitrogen remains unabsorbed and hence passes through the absorbent and is thus separated from the carbon dioxide. The pressure on the absorbent is subsequently reduced, which results in vaporization and release of the carbon dioxide from the liquid absorbent. This purified carbon dioxide can then be injected into the same well or an adjacent well in a hydrocarbon bearing formation for dissolving in the crude oil to be produced. The absorbent can be recycled to the well for continued separation of carbon dioxide from the flue gases.

As the absorbent for the carbon dioxide any suitable organic compound can be used, although absorbents selected from the group consisting of paraffinic hydrocarbons having three or more carbon atoms, and mixtures thereof, are preferred, more specifically, paraffinic hydrocarbons having three to about 8 carbon atoms with specific examples being butane, propane or pentane. Such hydrocarbons will absorb large amounts of carbon dioxide at high pressures and will readily release the carbon dioxide at moderate pressures. In this regard, propane can be used to particular advantage.

The nitrogen gas introduced into the well along with the carbon dioxide does not dissolve in the absorbent to any large extent due to the high pressure that would be required. The nitrogen can be allowed to pass up the tubing string of the well through which the absorbent is injected and can be subsequently vented to the atmosphere or utilized for commercial purposes.

The present invention may be more fully understood by reference to the accompanying drawing. As shown in the drawing a well 11 is drilled from the earth's surface through overburden rock 21 into a hydrocarbon bearing formation 20. The well comprises a casing 13 enclosed in cement 12 and is completed in the formation 20 through perforations 27 in the casing. A first tubing string 14 is hung within the well and connects toward its lower end with a second tubing string 17. A third tubing string 18 is connected to the bottom of the first tubing string 14. Advantageously, the junction of the third tubing string with the first tubing string can be 50 to 200 feet below the junction of the second tubing string with the first tubing string. A burner for carbonaceous fuels, not depicted in the drawing, can also be connected to the outer end of the second tubing string 17 so that flue gases which contain carbox dioxide and nitrogen can be conveyed into the first tubing string 14.

Using the arrangement shown in the drawing, flue gas, represented by line 26, is introduced into the second tubing string 17 simultaneously with the introduction of the liquid absorbent, represented at 15, into the first tubing string 14. The flue gas 26 and absorbent 15 are comingled at the intersection of the second tubing string 17 and the first tubing string 14, so as to allow the absorption of the carbon dioxide content of the flue gas by the absorbent contained in the lower end of tubing 14. Unabsorbed inert gases, especially nitrogen and represented at 16, bubble upward through the absorbent by their own buoyancy. At the earth's surface 22 the unabsorbed inert gases are removed through the first tubing string and are either discarded into the atmosphere or recovered for further use. Simultaneously, with the introduction of flue gas 26 and absorbent 15, the carbon dioxide ladened absorbent is allowed to flow to the earth's surface by decreasing the pressure head upon the third tubing string 18. The carbon dioxide ladened absorbent is then passed into a vaporization tank wherein a still lower pressure exists for vaporization and separation of carbon dioxide from the solvent. The carbon dioxide thus separated from the absorbent can then be passed through line 24 back to the well and can be reinjected into the annulus 19 between the first tubing string 14 and the casing 13 so that it enters the oil producing formation 20 through perforations 27 in the casing 13.

Therefore, the present invention provides a significant advantage over prior miscible gas drive processes in that downhole pressures are used in conjunction with a selective absorbent to produce purified carbon dioxide that is dissolved in the crude oil being produced. Although it can sometimes be necessary to maintain elevated pressures at the wellhead to develop a sufficient pressure downhole for substantially complete dissolving of the carbon dioxide in the absorbent, exceptionally high wellhead pressures or especially deep wells are not required as wells in the vicinity of 4,000 to 8,000 feet in depth will adequately provide the head pressure required. For example, the mere injection of propane at the surface with several hundred pounds of pressure thereon will provide several thousand pounds head pressure at a depth of 5,000 feet. Similarly, the vaporization unit may be maintained under pressures from 50 to 100 pounds less than the wellhead pressure maintained on the absorbent so that the carbon dioxide is flashed from the absorbent with little makeup pressure being required when reinjecting the absorbent into the first tubing string. Also, by utilizing a lower pressure on the vaporization unit than that at the wellhead causes a natural production of the carbon dioxide ladened absorbent from the bottomhole to the vaporization unit. Therefore, no external energy is required for the production of the carbon dioxide ladened absorbent from the well or for the flashing and separation of the carbon dioxide. In similar fashion, the unabsorbed nitrogen will naturally meander through the first tubing string to the surface and may be separated from the injected propane by a simple gas-liquid separator maintained at the wellhead. Relatively pure nitrogen can thus be bled off at the wellhead.

A compressor can be used for injection of flue gas into the system since the pressure of the flue gas stream will normally not be as high as that of the absorbent utilized within the system. To maintain a stable system, without pressure unbalance, and inhibit the absorbent from being produced through the flue gas injection inlet, the pressure of the flue gas stream should exceed the absorbent. Therefore, a pressure of 50 to 100 pounds above the pressure on the absorbent can be maintained on the flue gas at the surface so as to provide a safety check and stable system at the bottomhole.

EXAMPLE

Using an arrangement as shown in the drawing, one mole of methane is introduced into a burner and reacted with 10 moles of air. From this reaction 1 mole of carbon dioxide is produced along with 8 moles of nitrogen and 2 moles of water. The water is removed from the flue gases by scrubbing with a liquid dessicant, for example a monoethanol amine solution. The dried flue gases are then injected into the second tubing string 17 and are comingled with 0.681 moles of propane in the first tubing string 14 at an appropriate depth in the well to provide a pressure of 2,000 pounds and a temperature of 180°F. Eight moles of nitrogen are allowed to be released from the wellhead through the first tubing string 14. The 0.681 moles of propane and 1 mole of carbon dioxide pass upward through tubing string 18 and enter the vaporization unit 23. The vaporization unit is maintained at 300 pounds and 80°F. This vaporization releases 0.932 moles of carbon dioxide in a gaseous form whereas 0.681 moles of propane and 0.068 moles of carbon dioxide remain unvaporized. The propane, while containing the small amount of carbon dioxide, is reinjected into the first tubing string 14 for further comingling and absorption of carbon dioxide. A portion of the absorbent may be purged from the system with makeup propane being added so that stable conditions are maintained in the well for continued dissolving and purification of carbon dioxide. As previously indicated, the carbon dioxide stream 24 is fed from the vaporizer into the annulus 19 of the well for dissolving in the crude oil in formation 20.

Therefore, it can be seen that by employing known principles of engineering while following this disclosure as a guideline, the process of the present invention can be used to determine the proper amount of absorbent, pressures, temperatures, equipment size and other criteria necessary for the efficient separation and use of carbon dioxide from flue gases while requiring minimal amounts of energy and equipment.

In accordance with the previous description, the carbon dioxide that has been separated from the flue gases is injected into a crude oil producing formation through an annulus of the same well wherein carbon dioxide is dissolved in the absorbent. Accordingly, the well can be an injection well in a secondary or tertiary recovery process or an injection-production well in a "huff and puff" process. It will nonetheless be appreciated that the carbon dioxide could be injected into a separate but adjacent well which extends into the same or an adjacent producing formation.

With further regard to the point at which the flue gases are introduced into the tubing string for contact with the absorbent contained therein, the main consideration is to establish a zone within the tubing strings of sufficient length to permit substantially complete separation of nitrogen from the carbon dioxide in the first tubing string before passing the carbon dioxide ladened absorbent into the third tubing string 18 and thence to the vaporization tank 23. Accordingly, the invention has been described with reference to one embodiment wherein the flue gas is introduced into the first tubing string at a point which is located well above the point at which the absorbent is removed from the first tubing string and passed to the vaporization tank, e.g., establishing a distance of 50 to 200 feet between these two points. One purpose of this arrangement is to prevent carry-over of nitrogen and any other undissolved gases into the third tubing string 18, and it will thus be appreciated that the connection of the third tubing string 18 with the first 14 could alternatively be located above the connection of the second tubing string 17 with the first string provided that baffles, separator plates, or the like are used to prevent substantial carry-over of undissolved gases into the third tubing string 18.

It will also be understood that although the vaporizer tank 23 is located outside of the well 11, a suitable gas-liquid separator could also be located within the well when such is preferable and practical.

While the present invention has been described with reference to particular conditions, materials, apparatus and the like, it will nonetheless be appreciated by those skilled in the art that various changes and modifications can be made without departing from the scope of the invention as set forth in the following claims.

What is claimed is:

1. In a process for recovering crude oil from a hydrocarbon bearing formation wherein carbon dioxide is introduced into said formation for dissolving in the crude oil therein, the improvement which comprises:
   a. injecting an absorbent for carbon dioxide into a tubing string of a well, said absorbent being an organic compound in the form of a liquid when injected into the tubing string,
   b. introducing a flue gas which contains carbon dioxide and nitrogen into the tubing string containing the absorbent, the flue gas being introduced into said tubing string at a depth where the carbon dioxide dissolves in the absorbent whereas the nitrogen passes through it, thus separating and removing the nitrogen from the presence of the carbon dioxide,
   c. subsequently reducing the pressure on the absorbent and separating carbon dioxide which vaporizes and thus leaves the absorbent,
   d. injecting the separated carbon dioxide into a hydrocarbon bearing formation.

2. A process as in claim 1 wherein the absorbent is selected from the group consisting of paraffinic hydrocarbons having three or more carbon atoms and mixtures thereof.

3. A process as in claim 1 wherein the well is cased and completed and pressure is maintained at the wellhead on the absorbent to facilitate dissolving of carbon dioxide in the absorbent.

4. A process as in claim 1 wherein said well is cased and completed and wherein the separated carbon dioxide is injected through the well into the surrounding hydrocarbon bearing formation.

5. A process as in claim 1 wherein the carbon dioxide absorbent is injected into the well through the upper end of the tubing string, the flue gas is introduced into the tubing string for mixture with the absorbent at a point between the top and the bottom of said string, and a mixture of carbon dioxide dissolved in said absorbent is removed from the tubing string at a point removed from that at which the flue gas is introduced into the tubing string.

6. A process as in claim 5 wherein the absorbent containing the carbon dioxide is removed from the tubing string at a point located below the point at which the flue gas is introduced into the tubing string.

7. A process as in claim 6 wherein the point at which the absorbent containing the carbon dioxide is removed from the tubing string approximately 50 to 200 feet below the point at which the flue gas is introduced into the tubing string.

8. A process as in claim 5 wherein the absorbent containing the carbon dioxide is removed from the well, carbon dioxide is separated from the absorbent, and the absorbent is then reinjected into said well through the tubing string.

9. A process as in claim 5 wherein inert unabsorbed gases of the flue gases travel upwardly through the absorbent in the tubing string and are separated from the absorbent.

10. A process as in claim 1 wherein the absorbent is propane.

11. A process as in claim 1 wherein the flue gas is introduced into the tubing string at a depth of about 4,000 to about 8,000 feet.

12. A process as in claim 1 wherein a hydrocarbon fuel is burned with air to produce flue gases comprising carbon dioxide, nitrogen and water vapor, and the resulting flue gas is introduced into said tubing string.

13. A process as in claim 12 wherein water vapor is separated from said flue gases prior to introduction into said tubing string.

14. A process as in claim 1 wherein said well extends into a hydrocarbon bearing formation and the separated carbon dioxide is reinjected into said well.

15. A process as in claim 1 wherein the separated carbon dioxide is injected into a hydrocarbon formation adjacent said well.

* * * * *